US006844394B2

(12) United States Patent
Schmalstieg et al.

(10) Patent No.: US 6,844,394 B2
(45) Date of Patent: Jan. 18, 2005

(54) POLYFUNCTIONAL CARBOSILOXANES WITH LINEAR AND CYCLIC COMPONENTS

(75) Inventors: Lutz Schmalstieg, Köln (DE); Wolfgang Frank, Köln (DE); Markus Mechtel, Bergisch Gladbach (DE); Matthias Steiner, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 56 days.

(21) Appl. No.: 10/456,407

(22) Filed: Jun. 6, 2003

(65) Prior Publication Data

US 2003/0232921 A1 Dec. 18, 2003

(30) Foreign Application Priority Data

Jun. 11, 2002 (DE) .......................... 102 25 825

(51) Int. Cl.$^7$ .............................. C08L 83/06
(52) U.S. Cl. .................. 524/588; 524/837; 528/33; 528/35; 528/37; 556/431; 556/464; 427/387
(58) Field of Search ................. 427/387; 524/588, 524/837; 528/33, 35, 37; 556/431, 464

(56) References Cited

U.S. PATENT DOCUMENTS

| 4,461,867 A | 7/1984 | Surprenant | 524/788 |
| 4,525,400 A | 6/1985 | Surprenant | 428/54 |
| 5,189,193 A | 2/1993 | Freeburne et al. | 556/451 |
| 5,880,305 A | 3/1999 | Kraus et al. | 556/459 |
| 6,005,131 A | 12/1999 | Jentsch et al. | 556/434 |
| 6,136,939 A | 10/2000 | Mager et al. | 528/33 |
| 6,143,912 A | 11/2000 | Lindner et al. | 556/451 |
| 6,284,834 B1 | 9/2001 | Kirchmeyer et al. | 524/588 |

FOREIGN PATENT DOCUMENTS

| DE | 1 195 752 | 7/1965 |
| DE | 44 14 690 | 11/1995 |
| WO | 94/06807 | 3/1994 |

*Primary Examiner*—Samuel Barts
(74) *Attorney, Agent, or Firm*—Joseph C. Gil

(57) ABSTRACT

The invention relates to soluble organic-inorganic compositions comprising linear and cyclic hydrosiloxanes, to a novel process for preparing them and to their use as coating materials.

8 Claims, No Drawings

POLYFUNCTIONAL CARBOSILOXANES WITH LINEAR AND CYCLIC COMPONENTS

BACKGROUND OF THE INVENTION

The invention relates to soluble organic-inorganic compositions comprising linear and cyclic carbosiloxane components, to a novel process for preparing them and to their use as coating materials.

Polyfunctional cyclic carbosiloxanes have already been described. By way of example, U.S. Pat. No. 6,005,131 and WO-A 94/96807 disclose monomeric polyfunctional cyclic carbosiloxanes from which, in combination with metal alkoxides, organic-inorganic hybrid materials can be produced with the aid of the sol-gel process. These materials can be used, for example, for coating surfaces. The coatings thus obtained are distinguished by good solvent resistance and chemical resistance and also by a high level of mechanical wear resistance.

Various processes for preparing polyfunctional cyclic carbosiloxanes are disclosed in U.S. Pat. No. 4,461,867, 4,525,400 or 6,136,939. A disadvantage of the prior art processes cited is that for preparing polyfunctional carbosiloxanes they use pure cyclic hydrosiloxanes or pure cyclic alkenylsiloxanes as precursors. The preparation of cyclic hydro- and alkenylsiloxanes with a high level of purity is described, for example, in EP-A 0 967 236, U.S. Pat. No. 5,189,193, DE-A 1195752 and DE-A 4414690. In order to achieve the level of purity in the precursors that is required for the synthesis of cyclic carbosiloxanes, however, complex and thus costly work-up methods are needed.

A further disadvantage of the preparation processes known to date is their complex technical implementation, which has so far stood in the way of an industrial realization of these processes.

For preparing monomeric polyfunctional carbosiloxanes, WO-A 94/06807 and U.S. Pat. No. 4,525,400 disclose, for example, processes in which alkenylalkoxysilanes are reacted with organohydrocyclosiloxane by means of a hydrosilylation reaction. So that reaction is quantitative the alkenylalkoxysilane is used in excess. When reaction has ended unreacted precursor is removed by distillation. In U.S. Pat. No. 4,525,400 the reaction takes place in a solution with a concentration of 20% by weight, leading to a low space/time yield.

A disadvantage of the prior art processes described is that it is not possible to prepare organic-solvent-soluble condensation products of polyfunctional carbosiloxanes.

Further processes for preparing monomeric polyfunctional cyclic alkoxy- and hydroxy-functional carbosiloxanes are described in U.S. Pat. Nos. 6,005,131 and 5,880,305. The first reaction step comprises addition of a hydrochlorosilane to an alkenylcyclosiloxane. This is followed by hydrolysis or alcoholysis to give the corresponding monomeric polyfunctional cyclic carbosiloxanes. Since as a result of the required activation energy the hydrosilylation must be carried out preferably at elevated temperatures, there exists with this process the problem that, owing to the low boiling points of the hydroalkylchlorosilanes, fractions of the hydroalkylchlorosilane may escape from the reaction vessel during the reaction. A consequence of this is that unreacted alkenyl groups can remain in the end product and may adversely affect the quality of the product. With these processes, therefore, the degree of reaction after the hydrosilylation must be monitored by analysis and, where appropriate, further hydroalkylchlorosilane added. It is also possible directly to use an excess of hydroalkylchlorosilane, but such an excess must be removed again by distillation following the reaction.

A process for preparing soluble oligomeric cyclic alkoxy- or hydroxy-functional carbosiloxanes is described in U.S. Pat. No. 6,136,939. With this process as well, however, the above-described disadvantages occur.

An object of the present invention was therefore to provide compositions of polyfunctional carbosiloxanes which are soluble in organic solvents, a novel process for their preparation, and their use.

DESCRIPTION OF THE INVENTION

It has now been found that, by using mixtures of linear and cyclic hydrosiloxanes which are obtained as by-products of the preparation of SiH-functional silicone oils (and which can be used without further purification effort), novel soluble organic-inorganic compositions of polyfunctional carbosiloxanes are obtainable. At the same time a process for preparing them has been found which is notable for ready availability of the precursors, a simple operating regime and a high space/time yield.

The present invention provides soluble organic-inorganic compositions of oligomeric polyfunctional carbosiloxanes comprising A) at least one cyclic component of the formula (I),

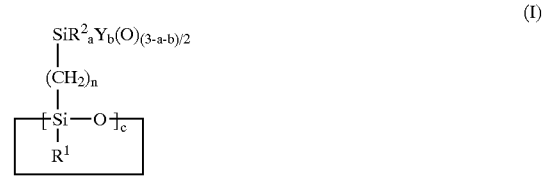

wherein

R$^1$ and R$^2$ are the same or different and represent linear, branched or cyclic C$_1$–C$_8$ alkyl radicals and/or C$_6$–C$_{14}$ aryl radicals; preferably methyl, ethyl, n-propyl, isopropyl, butyl, isobutyl, tert-butyl, n-pentyl, neopentyl, hexyl, heptyl, octyl, cyclopentyl, cyclohexyl, cycloheptyl, phenyl or naphthyl; with particular preference methyl or ethyl and with very particular preference methyl, Y is OH or C$_{1-C4}$ alkoxy, preferably OH or ethoxy, a is such that $0 \leq a \leq 2$, and is preferably 1 or 2, b is such that $0.5 \leq b \leq 2.8$ and $a+b \leq 3$, c is a number $\geq 3$, preferably a number from 3 to 8, n is a number from 2 to 10, preferably 2, and B) at least one linear component of the formula (II),

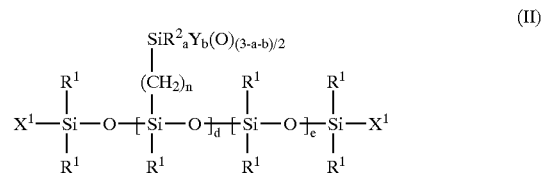

wherein

R$^1$, R$^2$, a, b, n and Y have the definition indicated for the formula (I),

X$^1$ is R$^1$ or —(CH$_2$)$_n$SiR$^2_a$Y$_b$(O)$_{(3-a-b)/2}$, preferably R$^1$, d is a number from 1 to 100, preferably a number from 1 to 30, e is a number from 0 to 50, preferably a number from 0 to 20.

The oligomeric polyfunctional carbosiloxanes of the invention contain 30–99% by weight, preferably 50–99% by weight, with particular preference 65–99% by weight of cyclic components of the formula (I), with the balance being the linear component, with the proviso that the sum of the %s by weight of both components is 100.

Preference is given to soluble organic-inorganic compositions of oligomeric polyfunctional carbosiloxanes comprising A) at least one cyclic component of the formula (III)

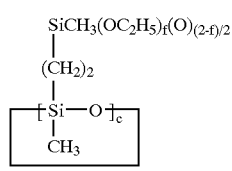
(III)

wherein f stands for 1.2 to 2 and c is a number $\geq 3$, preferably a number from 3 to 8, and B) at least one linear component of the formula (IV),

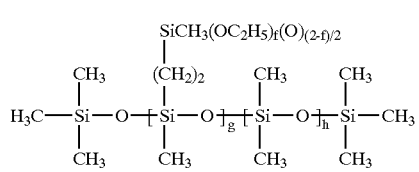
(IV)

wherein f stands for 1.2 to 2, g stands for 1 to 30 and h stands for 0 to 20, preferably for 0 to 10.

The amount of ethoxysilyl groups in the organic-inorganic compositions of the invention is at least 5.5 mmol/g, preferably at least 6.5 mmol/g. The average molecular weight (weight average, $M_w$) determined by rapid gel permeation chromatography (RGPC) is from 1,500 to 20,000 g/mol, preferably from 2,000 to 6,000 g/mol. The amount of hydrolysable chlorine is 0–100 ppm, preferably 0–50 ppm.

Without solvent, the viscosity of the organic-inorganic compositions of the invention lies below 1000 mPas (23° C.), preferably below 500 mPas (23° C.). The organic-inorganic compositions of the invention are soluble in many paint solvents, such as aromatic and aliphatic hydrocarbons or ketones.

Preference is likewise given to soluble organic-inorganic compositions of oligomeric polyfunctional carbosiloxanes comprising A) at least one cyclic component of the formula (V),

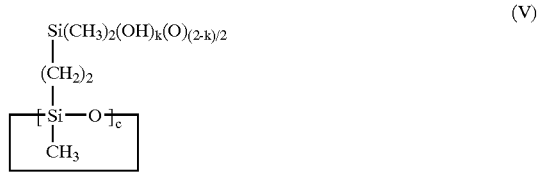
(V)

wherein k stands for 0.7 to 1 and c is a number $\geq 3$, preferably a number from 3 to 8, and B) at least one linear component of the formula (VI),

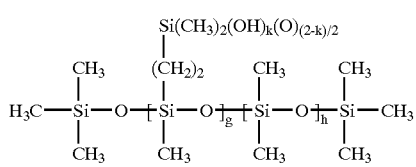
(VI)

wherein k stands for 0.7 to 1, g stands for 1 to 30 and h stands for 0 to 20, preferably for 0 to 10.

The invention further provides a process for preparing the soluble organic-inorganic compositions of the invention, characterized in that in a first process step a mixture (M1) of linear and cyclic hydrosiloxanes of the general formulae (VII) and (VIII),

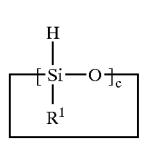
(VII)

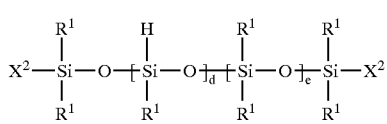
(VIII)

wherein

R$^1$ is a linear, branched or cyclic C$_1$–C$_8$ alkyl radical or C$_6$–C$_{14}$ aryl radical; preferably methyl, ethyl, n-propyl, isopropyl, butyl, isobutyl, tert-butyl, n-pentyl, neopentyl, hexyl, heptyl, octyl, cyclopentyl, cyclohexyl, cycloheptyl, phenyl or naphthyl; with particular preference methyl or ethyl and with very particular preference methyl, c is a number $\geq 3$, preferably a number from 3 to 8, d is a number from 1 to 100, preferably a number from 1 to 30, e is a number from 0 to 50, preferably a number from 0 to 20, and X$^2$ stands for H or R$^1$, preferably for R$^1$, is reacted with one or more silanes of the formula (IX), $$R^3SiR^2_a Z_{3-a} \quad (IX)$$

wherein

R² is a linear, branched or cyclic C₁–C₈ alkyl radical or C₆–C₁₄ aryl radical;
preferably methyl, ethyl, n-propyl, isopropyl, butyl, isobutyl, tert-butyl, n-pentyl, neopentyl, hexyl, heptyl, octyl, cyclopentyl, cyclohexyl, cycloheptyl, phenyl or naphtyl; with particular preference methyl or ethyl and with very particular preference methyl, a is such that 0≦a≦2, and is preferably 1 or 2, R³ is C₂–C₁₀ alkenyl, preferably vinyl, and Z stands for a hydrolysable group, preferably halogen, with particular preference for Cl, in the presence of a Pt catalyst to give a mixture (M2) of intermediates, comprising compounds of the general formulae (X) and (XI),

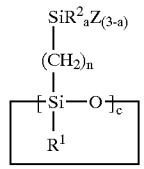

(X)

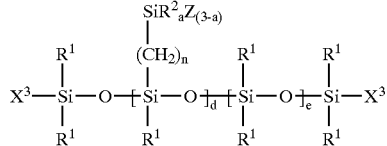

(XI)

wherein

R¹, R², Z, a, c, d, n and e are as defined above and

X³ stands for R¹ or —(CH₂)ₙSiR²ₐZ₍₃₋ₐ₎, preferably for R¹, and in a second reaction step the mixture (M2) of intermediates is subjected to an alcoholysis or hydrolysis with subsequent condensation.

The silanes of the general formula (IX) are used in stoichiometric amounts based on the hydrosilyl content.

A particular feature of the process of the invention is that in the first step the mixture (M1) is added to the silane/catalyst mixture in a closed vessel.

In the first step of the process of the invention a kettle with a stirrer mechanism is preferably charged with the silane of the general formula (IX), together with a hydrosilylation catalyst and a solvent, under an N₂ atmosphere and this initial charge is heated without pressure to a temperature which is sufficient to provide the activation energy required for the hydrosilylation reaction: the temperature here should be warmed to at least 45° C. The kettle is then pressure-sealed and the mixture (M1) is metered in under pressure control at a rate such that the internal pressure in the kettle does not exceed a maximum of 3 bar, preferably a maximum of 2 bar. After the end of the addition of the mixture (M1), stirring can be continued at elevated temperature where appropriate. The process of the invention ensures a quantitative reaction, so making it unnecessary to monitor the degree of reaction analytically and to work up the reaction solution for further reactions.

As hydrosilylation catalysts it is possible in principle to use the catalysts known from the prior art. Examples of hydrosilylation catalysts are platinum catalysts, such as chloroplatinic acid, alcohol-modified chloroplatinic acid, platinum-olefin complexes, such as platinum-vinylmethylcyclosiloxane complexes, platinum-carbonyl complexes, such as platinum-carbonyl-vinylmethylcyclosiloxane complexes, and platinum-diketonate complexes, such as platinum acetylacetonate. Preferred catalysts are platinum-olefin complexes, with particular preference being given to Silopren® U catalyst PT/S (68% strength solution of a cyclo[tetra(methylvinylsiloxane)]-ligand-substituted Pt complex in isopropanol) (GE Bayer Silicones, DE).

Suitable solvents are those which do not inhibit the hydrosilylation reaction. Examples thereof are aromatic and aliphatic hydrocarbons, such as toluene, xylene, solvent naphtha or aliphatic ethers. Preferred solvents are xylene and tert-butyl methyl ether.

Suitable mixtures (M1) are those having an SiH content of at least 10 mmol/g, preferably of at least 13 mmol/g.

The second step of the process of the invention comprises either a hydrolysis or an alcoholysis of the mixture (M2) with subsequent condensation. The mixture (M2) can be used without further working up. The process of the invention can therefore be carried out as a one-pot synthesis.

Hydrolysis takes place with water in the presence of a base or base mixture and with an organic solvent or solvent mixture.

The reaction is therefore carried out as a two-phase reaction; in other words, the hydrolysis takes place at the phase boundary of a two-phase mixture composed of an organic phase, in which not only the Si-halogen-containing precursors but also the SiOH-functional products dissolve, and an aqueous phase in which base and the salt formed during the reaction are dissolved.

Suitable solvents of the organic phase for the purposes of the invention include all organic solvents and/or solvent mixtures which are not fully miscible with water. The solvent mixture may where appropriate be a single-phase or multiphase mixture. It is preferred to use aliphatic ethers, with particular preference tert-butyl metyl ether.

As bases for the purposes of the invention it is possible to use all water-soluble bases and mixtures thereof, such as NH₃, alkali metal hydroxides, ammonium and alkali metal carbonates, hydrogen carbonates, phosphates, hydrogen phosphates and/or acetates. Preference is given to using NH₃, alkali metal hydroxides, alkali metal carbonates and/or alkali metal hydrogen carbonates, with particular preference NH₃.

Based on the amount of acid released during the hydrolysis, the bases are used preferably stoichiometrically or in an excess; preferably in an excess of from three to ten times when using NH₃ as base.

In the case of alcoholysis the second step of the process of the invention takes place by charging a kettle incorporating stirrer mechanism with the mixture (M2) and adding a linear or branched C₁–C₄ alcohol, for example methanol, ethanol or iso-propanol, preferably ethanol, to the reaction surface under atmospheric pressure. To control the degree of condensation it is also possible to add a defined amount of water to the C₁–C₄ alcohol. The amount of water is such that subsequently the amount of alkoxysilyl groups and the average molar mass (weight average, M_w), as determined by rapid gel permeation chromatography (RGPC), of the polyfunctional carbosiloxanes is situated within the limits according to the invention. At most 1000 mmol, preferably at most 500 mmol of water, with very particular preference at most 300 mmol of water are added per mole of SiCl. The metering of the alcohol is controlled so that the internal temperature of the kettle does not exceed 50° C., preferably 40° C.

When alcoholysis is over, the excess $C_1$–$C_4$ alcohol and the hydrogen halide released are distilled off under reduced pressure. Where appropriate, distillation may be followed by a second alcoholysis, preferably with the same $C_1$–$C_4$ alcohol. Following distillation, neutralization is carried out with a base, where appropriate with renewed addition of the corresponding $C_1$–$C_4$ alkyl alcohol. Examples of suitable neutralizing agents include alkali metal carbonates; preferably sodium carbonate is used. It has proven to be advantageous if the neutralization is conducted at elevated temperature, preferably at a temperature of at least 40° C., with the addition of a $C_1$–$C_4$ alkyl alcohol solubilizer. Under these conditions neutralization is complete within 30 to 60 minutes. A finely divided neutralization residue is precipitated which can be filtered very effectively. Where appropriate, any solvent still present is distilled off and the neutralization residue is removed by filtration.

Where an alcoholysis is conducted in the second step of the process of the invention, the silane of the general formula (IX) is preferably methylvinyldichlorosilane. For the preparation of hydroxy-functional (hydrolysis) carbosiloxanes of the invention the preferred silane of the general formula (IX) is dimethylvinylchlorosilane.

The yield of the polyfunctional carbosiloxane of the invention, based on the amount of mixture (M1) used, is at least 90%.

The inventive reaction regime of the hydrosilylation (process step 1) ensures that the reaction is quantitative. In contrast to prior art processes, therefore, there is no need for analytical monitoring of the degree of conversion. Subsequent metering of a reaction component, associated with an associated additional reaction time, is unnecessary. Also removed are the use of an excess of a reaction component and the associated distillation step after the end of the reaction.

The second process step according to the invention has the advantage over the prior art that the alcoholysis and condensation can be carried out under atmospheric pressure and the alcohol is added to rather then below the reaction surface. The apparatus required by the process of the invention is greatly reduced in comparison with the prior art. A further advantage arises through the neutralization process, which is improved in comparison with the prior art.

The filtration time is accelerated as a result of the finely divided neutralization residue; the yield losses are minimized.

The advantages of the process of the invention can be exploited generally in the preparation of polyfunctional alkoxy- and/or hydroxy-functional carbosiloxanes.

The invention additionally provides for the use of the organic-inorganic compositions of oligomeric polyfunctional carbosiloxanes of the invention as reaction partners in condensation-crosslinking siloxane compositions and also for the preparation or modification of organic or inorganic surface coating materials.

The present invention likewise provides organic or inorganic surface coating materials and also condensation-crosslinking siloxane compositions which comprise the compositions of the invention.

Coating materials comprising the compositions of the invention may comprise organofunctional metal alkoxides and/or their hydrolysates or condensates, organic polymers or inorganic nanoparticles. The coatings resulting from them feature particularly high mechanical stability and can be used, for example, for coating plastics or as an additional coating film on organic coatings. It is likewise possible to add fluorine-containing components to the coating materials, so allowing the production of hydrophobic and/or oleophobic coatings. These hydrophobic and/or oleophobic coating compositions find use, for example, as an anti-stick coat.

EXAMPLES

The mixture (M1) used in the inventive examples, consisting of 28% linear and 72% cyclic hydrosiloxanes and having an Si-H content of 15.1 mmol/g, was obtained from GE Bayer Silicones, Germany under the designation G-Destillate. The mixture is a by-product of the preparation of SiMeH-containing silicone oils.

1,3,5,7-Tetramethyl-1,3,5,7-tetravinylcyclotetrasiloxane, methylvinyldichlorosilane, dimethylvinylchlorosilane, dichloromethylsilane, vinyltriethoxysilane and 1,3,5,7,9-pentamethylcyclopentasiloxane were obtained from ABCR, Germany and used without prior treatment.

The platinum-divinylsiloxane complex, with a platinum content of from 3 to 3.5%, was obtained from Hüls America Inc. (Hüls PC 072, 3 to 3.5% Pt in xylene). Silopren® U catalyst PT/S (68% strength solution of a cyclo-[tetra (methylvinylsiloxane)]-ligand-substituted Pt complex in isopropanol) was obtained from GE Bayer Silicones, Germany.

The solvents used are exclusively technical-grade products, used without further treatment beforehand.
Preparation of an Oligomeric Ethoxy-functional Carbosiloxane

Example 1
Inventive Hydrosilylation 1693 g (12.0 mol) of methylvinyldichlorosilane, 630 g of xylene and 166 mg of platinum catalyst (Silopren® U catalyst PT/S) were heated to 80° C. with stirring in a pressure-rated apparatus. The apparatus was pressure-sealed. Subsequently a total of 794.7 g of a mixture M1 composed of 28% linear and 72% cyclic hydrosiloxanes and having an Si-H content of 15.1 mmol/g (a total of 12 mol of SiH) were introduced into the reaction mixture in such a way that the pressure did not rise above 3 bar. An exothermic reaction took place. After the end of the addition, stirring was continued at 130° C. for 2 hours, after which the product was cooled to room temperature and the apparatus let down with nitrogen.

Following the reaction, no Si-vinyl or SiH groups were detectable in the $^1$H-NMR [$CDCl_3$].

Example 2
Inventive Alcoholysis and Condensation

Without further work-up of the reaction solution prepared in Example 1, 2177 g of ethanol were added dropwise to the surface of the reaction mixture, with stirring, at a rate such that the temperature did not rise above 40° C. Distillation was subsequently carried out to a pressure of 50 mbar and a temperature of 60° C. The procedure was repeated with a further 1010 g of ethanol. Finally, neutralization was carried out with sodium carbonate at 60° C. for 30 minutes and the reaction mixture was heated to 130° C. under atmospheric pressure and filtered.

This gave 2552 g (96.7% of theory, based on initial mass of mixture M1 in Example 1) of a clear, pale yellow polyfunctional carbosiloxane having a viscosity of 91 mpas, a density of 1.0 g/ml and a residual hydrolysable chlorine content of 12 ppm. The molar mass distribution was determined by rapid gel permeation chromatography (RGPC) using dichloromethane as solvent and an IR detector. The product had an average molar mass distribution with a numerical average ($M_n$) of 1830 g/mol and a weight average ($M_w$) of 5730 g/mol. In the $^1$H-NMR [CDCl$_3$] an amount of 8.27 mmol of SiOEt/g was found.

Example 3
Inventive Alcoholysis and Condensation

To 1000 g of the solution prepared in Example 1, a total of 725 g of ethanol and 18 g of water were added dropwise to the surface of the reaction mixture, with stirring, at a rate such that the temperature did not rise above 40° C. Distillation was subsequently carried out to a pressure of 50 mbar and a temperature of 60° C. The procedure was repeated with a further 350 g of ethanol. Finally, neutralization was carried out with sodium carbonate at 60° C. for 30 minutes and the reaction mixture was heated to 130° C. under atmospheric pressure and filtered.

This gave 832 g (98.2% of theory) of a clear, pale yellow carbosiloxane having a viscosity of 245 mPas, a density of 1.01 g/ml and a residual hydrolysable chlorine content of 7 ppm. The molar mass distribution was determined by rapid gel permeation chromatography (RGPC) using dichloromethane as solvent and an IR detector. The product had an average molar mass distribution with a numerical average ($M_n$) of 2150 g/mol and a weight average ($M_w$) of 15 530 g/mol. In the $^1$H-NMR [CDCl$_3$] an amount of 7.47 mmol of SiOEt/g was found.

Preparation of Oligomeric Hydroxy-functional Carbosiloxanes

Example 4
Inventive Hydrosilylation 241 g (2.0 mol) of dimethylvinylchlorosilane, 105 g of xylene and 24 mg of platinum catalyst (Silopren® U catalyst PT/S) were heated to 50° C. with stirring in a pressure-rated apparatus. The apparatus was pressure-sealed. 138 g of a mixture composed of 32% linear and 68% cyclic hydrosiloxanes and having an Si-H content of 14.5 mmol/g (a total of 2 mol of SiH) were introduced into the reaction mixture in such a way that the pressure did not rise above 3 bar. An exothermic reaction took place. After the end of the addition, stirring was continued at 60° C. for 2 hours, after which the product was cooled to room temperature and the apparatus let down with nitrogen.

Following the reaction, no Si-vinyl or SiH groups were detectable in the $^1$H-NMR [CDCl$_3$].

Example 5
Hydrolysis and Condensation in Accordance with U.S. Pat. No. 5,880,305

340 g of 25% by weight aqueous ammonia solution, 130 g of water and 400 g of tert-butyl methyl ether were charged to a kettle incorporating a stirrer mechanism and a drain valve in the base. A total of 484 g of an intermediate prepared in accordance with Example 4 were added dropwise with stirring. Stirring was then continued for 1 hour and the aqueous phase was separated off. The organic phase was washed to neutrality with water, and 350 of n-butanol were added. Distillation was carried out under reduced pressure to a solids content of 60% by weight.

This gave 502 g (93% of theory) of a 60% strength solution of a hydroxy-functional carbosiloxane in n-butanol with a viscosity of 55 mPas, a density of 0.93 g/ml and a residual hydrolysable chlorine content of 15 ppm. The molar mass distribution was determined by means of rapid gel permeation chromatography (RGPC) with dichloromethane as solvent and an IR and RI detector. The product had an average molar mass distribution with a number average ($M_n$) of 1134 g/mol and a weight average ($M_w$) of 2130 g/mol. In the $^1$H-NMR [d$_6$]-DMSO an amount of 3.8 mmol of SiOH/g was found.

Comparative Examples

In Comparative Example 1 and 2 an oligomeric polyfunctional cyclic carbosiloxane (condensation product of 1,3,5,7-tetramethyl-1,3,5,7-tetra(2-(diethoxymethylsilyl)-ethylene)cyclotetrasiloxane) is prepared in accordance with Example 2 from U.S. Pat. No. 6,136,939.

Comparative Example 1
Hydrosilylation

Under a nitrogen atmosphere, 516 g (1.5 mol) of pure 1,3,5,7-tetramethyl-1,3,5,7-tetravinylcyclotetrasiloxane, 288 g of xylene and 80 mg of platinum catalyst (Silopren® U catalyst PT/S) were charged to a stirred apparatus with reflux condenser and dropping funnel and heated to 80° C. 690 g (6.0 mol) of dichloromethylsilane were added dropwise with stirring. An exothermic reaction took place. After the end of the addition, stirring was continued at 130° C. for 2 hours, the product was cooled to room temperature and the apparatus was let down with nitrogen. After the reaction, $^1$H-NMR [CDCl$_3$] showed 7731 ppm of Si-vinyl groups. This corresponds to 0.21 mol of Si-vinyl groups or 3.5 mol % of unreacted Si-vinyl groups. For the complete reaction of all Si-vinyl groups it was necessary to add a further 24.2 g (0.21 mol) of dichloromethylsilane followed by stirring at 130° C. for 2 hours. Following further hydrosilylation, no Si-vinyl groups were found in the $^1$H-NMR [CDCl$_3$].

Comparative Example 2
Alcoholysis and Condensation 1245 g of ethanol were introduced through a dip tube below the liquid surface to 600 g of the intermediate obtained in accordance with Comparative Example 1, under a vacuum of 500 mbar. Distillation was then carried out to a pressure of 10 mbar and a temperature of 60° C., and the reaction mixture was blanketed with N$_2$. Then a further 623 g of ethanol were introduced through a dip tube below the liquid surface under a vacuum of 500 mbar. Distillation was then carried out to a pressure of 10 mbar and a temperature of 60° C. followed by blanketing with N$_2$. Ammonia was introduced to saturation through a gas inlet tube and the mixture was stirred for 4 hours. Excess ammonia was then removed under a gentle vacuum and ammonium chloride was filtered off. The filtrate was heated, filtration aid (kieselguhr) was added, and the reaction mixture was filtered.

This gave 1319 g (68% of theory, based on initial mass of 1,3,5,7-tetramethyl-1,3,5,7-tetravinylcyclotetrasiloxane in Comparative Example 1) of a clear, pale yellow carbosiloxane having a viscosity of 80 mPas, a density of 1.0 g/ml and a residual hydrolysable chlorine content of 7 ppm. The molar mass distribution was determined by rapid gel permeation chromatography (RGPC) using dichloromethane as solvent and an IR and RI detector. The product had an average molar mass distribution with a numerical average ($M_n$) of 1530 g/mol and a weight average ($M_w$) of 3355 g/mol. In the $^1$H-NMR [CDCl$_3$] an amount of 8.4 mmol of SiOEt/g was found.

Comparative Example 3
Preparation of a Monomeric Cyclic Carbosiloxane in Accordance with Example 10 in WO-A 94/06807

Under a nitrogen atmosphere, a total of 2.89 g (0.0096 mol corresponding to 0.048 mol of SiH) of 1,3,5,7,9-pentamethylcyclopentasiloxane are added dropwise to a mixture consisting of 10.3 g (0.0527 mol) of vinyltriethoxysilane (10% excess of vinyltriethoxysilane) and 12 drops of a platinum-divinylsiloxane complex (Hüls® PC 072, 3-3.5% Pt, diluted 5:1 with xylene). Stirring was then carried out at 90° C. for 6 hours. After the end of the reaction, the mixture was cooled to room temperature, xylene and the excess vinyltriethoxysilane were distilled off through an oilpump vacuum, and the apparatus was let down with nitrogen. This gave 8.53 g (0.0068 mol, 71% of theory) of a clear, pale yellow liquid.

Preparation of Inorganic Surface Coating Materials (Inventive)

Example 6

6.2 g of a condensation product of tetraethoxysilane in the form of a 50% strength by weight solution in n-butanol and 3.0 g of a 2% strength solution of para-toluenesulphonic acid were added dropwise with stirring to a mixture consisting of 4.2 g of an oligomeric ethoxy-functional carbosiloxane prepared in accordance with Example 2 and 0.42 g of an oligomeric hydroxy-functional carbosiloxane prepared in accordance with Example 5, and the constituents were stirred together homogeneously. The solution was drawn down in a film thickness of 30 μm onto a degreased glass plate, using a doctor blade, and was cured at 130° C. for 30 minutes. This gave a hard, transparent coating which is highly resistant to organic solvent.

Example 7

10 g of an oligomeric ethoxy-functional carbosiloxane prepared in accordance with Example 2 were stirred homogeneously with 2.4 g of a condensation product of tetraethoxysilane in the form of a 50% strength by weight solution in n-butanol, 2.0 g of an α,ω-hydroxy-functional polydimethylsiloxane having an OH content of about 7.5% and 0.2 g of an approximately 2% strength solution of para-toluenesulphonic acid in n-butanol. The solution was drawn down in a film thickness of 100 μm onto a degreased glass plate, using a doctor blade, and dried at room temperature for 24 hours. The transparent coating was not used by a permanent marker from Edding (Edding 85C). 24 hours after application, the marker could be removed using a cloth without the aid of cleaning agent.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Soluble organic-inorganic compositions of oligomeric polyfunctional carbosiloxanes comprising A) at least one cyclic component of the formula (I), $$\begin{array}{c} SiR^2{}_a Y_b(O)_{(3-a-b)/2} \\ | \\ (CH_2)_n \\ | \\ \boxed{\begin{array}{c} -Si-O- \\ | \\ R^1 \end{array}}_c \end{array} \quad (I)$$

wherein
R$^1$ and R$^2$ may be the same or different and represent linear, branched or cyclic C$_1$–C$_8$ alkyl radicals and/or C$_6$–C$_{14}$ aryl radicals,
Y is OH or C$_1$–C$_4$ alkoxy,
a is such that $0 \leq a \leq 2$,
b is such that $0.5 \leq b \leq 2.8$ and $a+b \leq 3$,
c is a number $\geq 3$,
n is a number from 2 to 10, and B) at least one linear component of the formula (II), $$\begin{array}{c} SiR^2{}_a Y_b(O)_{(3-a-b)/2} \\ | \\ R^1 \quad (CH_2)_n \quad R^1 \quad R^1 \\ | \quad | \quad | \quad | \\ X^1-Si-O-[-Si-O-]_d[-Si-O-]_e-Si-X^1 \\ | \quad | \quad | \quad | \\ R^1 \quad R^1 \quad R^1 \quad R^1 \end{array} \quad (II)$$

wherein
R$^1$, R$^2$, a, b, n and Y have the definition indicated in the general formula (I),
X$^1$ is R$^1$ or $-(CH_2)_n SiR^2{}_a Y_b(O)_{(3-a-b)/2}$,
d is a number from 1 to 100, and
e is a number from 0 to 50.

2. The soluble organic-inorganic compositions of claim 1 comprising

A) at least one cyclic component of the formula (III)

$$\begin{array}{c} SiCH_3(OC_2H_5)_f(O)_{(2-f)/2} \\ | \\ (CH_2)_2 \\ | \\ \boxed{\begin{array}{c} -Si-O- \\ | \\ CH_3 \end{array}}_c \end{array} \quad (III)$$

wherein
f stands for 1.2 to 2,
c is a number $\geq 3$ and

B) at least one linear component of the formula (IV), $$\begin{array}{c} SiCH_3(OC_2H_5)_f(O)_{(2-f)/2} \\ | \\ CH_3 \quad (CH_2)_2 \quad CH_3 \quad CH_3 \\ | \quad | \quad | \quad | \\ H_3C-Si-O-[-Si-O-]_g[-Si-O-]_h-Si-CH_3 \\ | \quad | \quad | \quad | \\ CH_3 \quad CH_3 \quad CH_3 \quad CH_3 \end{array} \quad (IV)$$

wherein
f stands for 1.2 to 2,
g stands for 1 to 30 and
h stands for 0 to 20.

3. The soluble organic-inorganic compositions of claim 1 comprising

A) at least one cyclic component of the formula (V), $$\begin{array}{c} Si(CH_3)_2(OH)_k(O)_{(2-k)/2} \\ | \\ (CH_2)_2 \\ | \\ \boxed{\begin{array}{c} -Si-O- \\ | \\ CH_3 \end{array}}_c \end{array} \quad (V)$$

wherein
k stands for 0.7 to 1,
c is a number $\geq 3$ and

B) at least one linear component of the formula (VI),

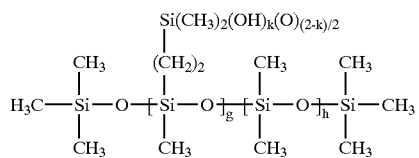

(VI)

wherein
k stands for 0.7 to 1,
g stands for 1 to 30 and
h stands for 0 to 20.

4. A process for preparing the soluble organic-inorganic compositions of claim 1, comprising i) reacting a mixture (M1) of linear and cyclic hydrosiloxanes of the formulae (VII) and (VIII),

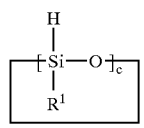

(VII)

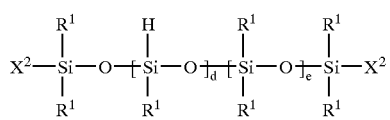

(VIII)

wherein
$R^1$ is a linear, branched or cyclic $C_1$–$C_8$ alkyl radical and/or $C_6$–$C_{14}$ aryl radical,
c is a number $\geq 3$ and
d is a number from 1 to 100,
e is a number from 0 to 50 and
$X^2$ stands for H or $R^1$,
with silanes of the formula (IX),

(IX)

wherein
$R^2$ is a linear, branched or cyclic $C_1$–$C_8$ alkyl radical and/or $C_6$–$C_{14}$ aryl radical, a is such that $0 \leq a \leq 2$,
$R^3$ is $C_2$–$C_{10}$ alkenyl and
Z stands for a hydrolysable group,
in the presence of a Pt catalyst to give a mixture (M2) of intermediates, comprising compounds of the formulae (X) and (XI),

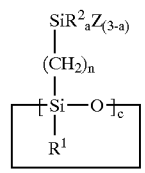

(X)

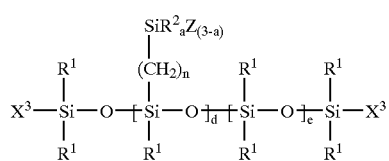

(XI)

wherein
$R^1$, $R^2$, Z, a, c, d, n and e are as defined above and
$X^3$ stands for $R^1$ or —$(CH_2)_n SiR^2_a Z_{(3-a)}$, and
ii) subjecting the mixture (M2) of intermediates to an alcoholysis or hydrolysis with subsequent condensation.

5. The process of claim 4, wherein in the first step the mixture (M1) is added to the initial silane/catalyst mixture charge in a closed vessel.

6. The process of claim 4, wherein both steps are carried out in the same reactor.

7. Condensation-crosslinking siloxane compositions comprising the soluble organic-inorganic compositions of claim 1.

8. Organic or inorganic surface coating materials comprising the soluble organic-inorganic compositions according of claim 1.

* * * * *